Oct. 20, 1964  M. ETTER  3,153,736

MECHANICALLY OPERABLE ELECTRIC IMPULSE GENERATOR

Filed Jan. 30, 1961  2 Sheets-Sheet 1

Oct. 20, 1964  M. ETTER  3,153,736
MECHANICALLY OPERABLE ELECTRIC IMPULSE GENERATOR
Filed Jan. 30, 1961 2 Sheets-Sheet 2
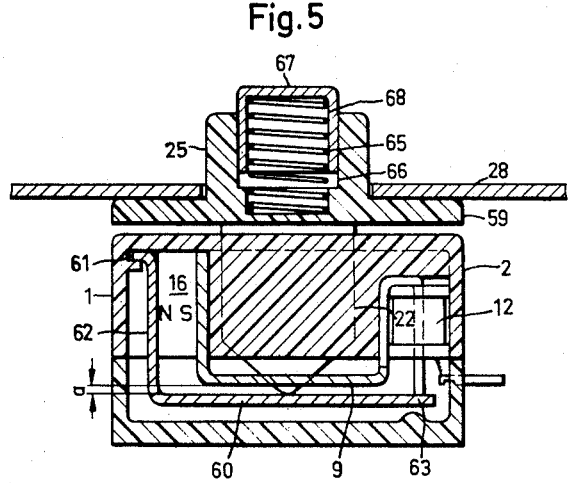
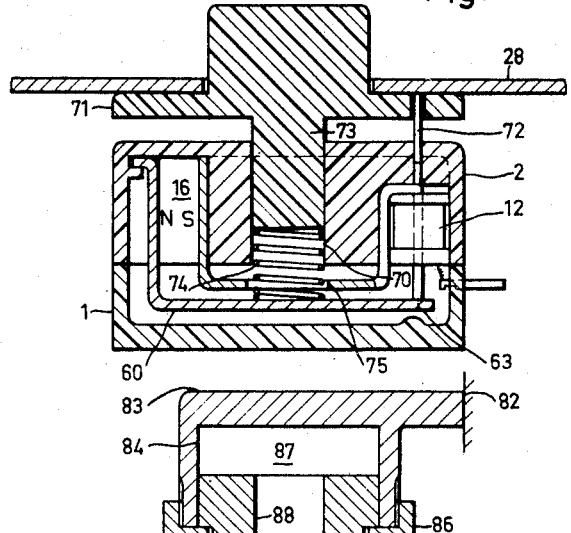
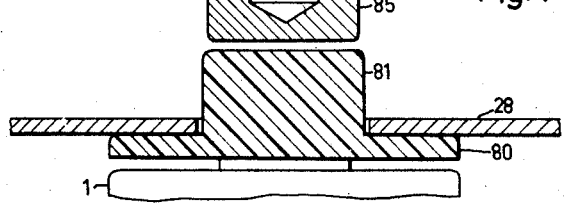

United States Patent Office 3,153,736
Patented Oct. 20, 1964

3,153,736
MECHANICALLY OPERABLE ELECTRIC
IMPULSE GENERATOR
Marcel Etter, Carouge, Geneva, Switzerland, assignor to Schweizerische Wagons- und Aufzugefabrik A.-G. Schlieren-Zurich, Schlieren, Switzerland
Filed Jan. 30, 1961, Ser. No. 85,703
Claims priority, application Switzerland, Jan. 30, 1960, 1,025/60
3 Claims. (Cl. 310—15)

The present invention relates to a contactless, inductive generator having a magnetic circuit guided over an induction coil and serving to produce an electric signal. This magnetic circuit has a movable pole shoe usually held against a stationary pole shoe of the circuit by magnetic flux and which may be moved away from this stationary pole shoe by means of a movable handle.

There is a contactless inductive generator known in the art which produces, by the inserting of a core into a hollow coil body having a primary and having a secondary winding, a potential in the secondary winding. This generator has the substantial drawback that it must be provided with a winding producing the required magnetic flux so that four leads are required for connecting the generator with the control. In the case of a generator not mounted in the neighbourhood of the control as it may be the case with elevators, assembling lines and the like, necessarily requires a considerable amount of lead material.

According to the induction law a determinated flux variation in a winding generates at the terminals thereof a potential time area proportional to the flux variation. This means that with rapid flux variation a high potential amplitude occurs for a short period. In order to obtain with the least possible expense the required minimum potential for the operation of a subsequent utilization device it would be desirable to have a device producing very rapid and repeatable flux variations independent of the speed of actuation.

In a known magnetic generator a leaf spring comprising a hammer is pre-tensioned by an actuating button. The force of the tension imparts to the hammer after the release a kinetic energy sufficient to produce after the impact of the hammer onto a movable core closing the flux and produced by a permanent magnet in a magnetic system a rapidly increasing air gap leading to the formation of a pulse in the core.

This arrangement has the drawback that the main portion of the spring force serves to separate the magnetic attraction between the movable core and the following pole shoe so that for the rapid production of the air gap the major portion of the energy is already consumed. In order to obtain the required minimum potential in spite thereof it is necessary to correspondingly make larger the magnetic system which in turn renders impossible a miniaturizing of the construction and leads to substantial costs.

It is a prime object of the present invention to realize a contactless, inductive generator which in addition to a common lead, for example ground, has only one lead as a connection to the utilization device and which produces for a small switching period independent of the speed of actuation and provided a short switch path. Moreover in the generator the stored energy shall be as great as possible for producing the air gap at the formation thereof and its dimensions should be as small as possible.

According to the invention these and further objects are attained in that when a handle is moved in the direction of a separation of two pole shoes a force substantially equal to that required for the separation of the two pole shoes is stored. At the very moment of the separation of the two pole shoes this force becomes active at the movable pole shoe in the sense of an increase of the air gap, whereby a rapid increase of the air gap is caused and in the windings a pulse of repeatable shape is obtained. The increase of the air gap and consequently the pulse are accordingly independent of the speed at which the handle is actuated.

Other features and advantages of the invention shall become apparent from the description now to follow, of preferred embodiments thereof, given by way of example only and in which reference will be made to the accompanying drawings, in which:

FIGURE 5 is a section through a contactless, inductive generator, having a movably arranged pole shoe and a displaceable push button.

FIGURE 6 is a section through a modification to FIGURE 5.

FIGURE 7 is a section through a part of a contactless, inductive generator with release.

Figure 1:
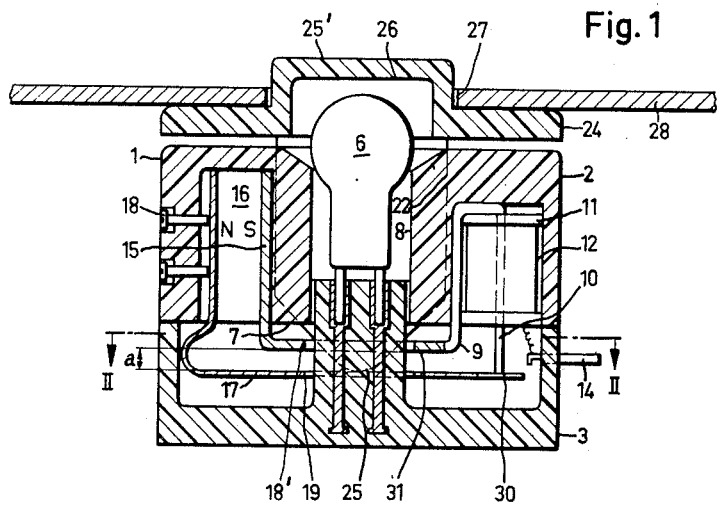
FIGURE 1 is a section through a contactless, inductive generator having a resilient pole shoe.
Figure 2:
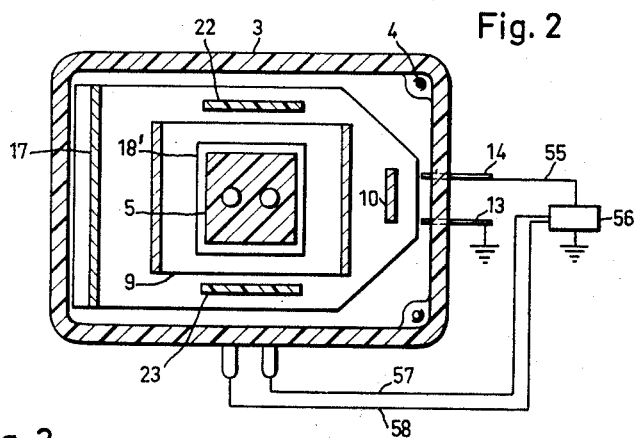
FIGURE 2 is a section taken along the line II—II in FIGURE 1.

Referring now to the drawings the contactless, inductive generator of FIGURES 1 and 2 comprises a casing 1 made of insulating material and consisting of an upper part 2 and of a lower part 3, these two parts being connected by bolts 4. The threaded borings for the bolts 4 traverse the lower part 3 and serve to secure the casing 1 to a not represented protective housing. The lower part 3 is provided with a lamp socket 5 for receiving a signal lamp 6. The latter may serve for example to indicate the pulse of the generator received by a control. The upper part 2 has a middle portion 7 having a boring 8 for the signal lamp 6. The middle portion 7 has mounted thereon a stationary, U-shaped pole shoe 9 of magnetically conductive material, for example of soft iron. The pole shoe 9 has a leg 10 onto which is mounted a coil body 11 of insulating material carrying a winding 12. Both ends of the winding 12 are connected with terminals 13 and 14 projecting through the lower part 3. To a further leg 15 of the pole shoe 9 is connected with is south pole a permanent magnet 16 having its north pole connected with a movable pole shoe 17 in form of a spring tongue of a material conductive to magnetical flux. The pole shoe 9, the permanent magnet 16 and the pole shoe 17 are held at the middle portion 7 of not magnetisable material by screws 18. As well the pole shoe 9 as also the pole shoe 17 are provided with recesses 18' and 19 for the lamp socket 5. The pole shoe 17 is in contact at point 30 with the end portion of the leg 10 of pole shoe 9. The pole shoes 9 and 17 form a magnetic circuit together with the permanent magnet 16.

The cover of the upper part 2 is provided with a pair of slots guiding two operating arms 22 and 23 of rectangular shape of a movable handle 24 made of light-permeable, insulating material. Both arms 22 and 23 are rounded at their lower end as at 25 and this rounding is in operational connection with the second pole shoe 17. The handle 24 has a push button 25' with a hollow space 26 into which projects the signal lamp 6. The push button 25' leads through a boring 27 of a cover plate 28 of the already mentioned protective housing (not shown).

According to the present invention the actuating member (to which the actuating force is supplied with variable speed) actuates a movable pole shoe not directly but by a spring means. So, prior to the separation of the poles the actuating movement tensions the spring means. When the spring means is fully tensioned the actuating force is transmitted to the movable pole shoe so that the latter is separated from the stationary pole shoe but is still under the influence of an attractive magnetic force. This force now is counteracted by the stored spring force so that full separation of the poles now is rapidly obtained under the action of this spring.

In summary, the (fast or slow) actuating movement tensions the spring means without separating the pole shoes and so stores a certain energy in the spring means;

Then the further actuating movement separates the poles up to the presence of a very small air gap but without substantially moving the movable pole shoe away from the stationary pole shoe;

Then the force stored in the spring means overcomes the magnetic force still attracting the movable pole shoe so as to rapidly and fully separating the pole shoes.

The production of a signal by the described generator is effected in the following manner: In the rest position of the movable handle 24 as illustrated by FIGURE 1 the movable pole shoe 17 as already mentioned is in contact with the end portion of the leg 10 of the pole shoe 9. A magnetic flux thus flows from the south pole of the permanent magnet 16 and over the pole shoes 9 and 17 to the north pole of the permanent magnet 16 and produces there at the point of contact 30 of the two pole shoes 9 and 17 a magnetic attraction coupling the two pole shoes.

Figure 3:
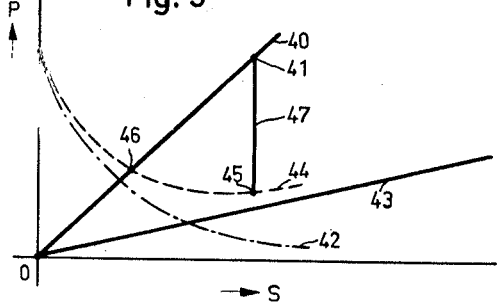
FIGURE 3 is a force-path diagram associated to the generator shown in FIGURES 1 and 2.

If now a force of actuation is exerted onto push button 25 for example by the tip of a finger a course of force is produced at pole shoe 17 in accordance with the force-path diagram of FIGURE 3. In the latter the ordinate shows the force of actuation P and the abscissa indicates the path S of the handle 24. Since the pole shoe 17 is coupled by the magnetic attraction at point 30 with the leg 10, the pole shoe 17 acts analoguously to a beam clamped at one end and having a movable support, so that the course of the force beginning at point O follows a line 40, i.e. the pole shoe 17 having the shape of a spring-tongue is flexed by the two arms 22 and 23 and a force is stored in pole shoe 17. As soon as this stored force attains approximately the amount of the magnetic attraction force at the point of contact 30, which is the case at point 41, there is produced owing to this stored force in the pole shoe 17 an air gap increasing at high speed independently of the speed of actuation of the handle 24. The point of release of this air gap always is at point 41.

The shape of the pole shoe 9 is chosen in such manner that its middle portion 31 is separated from pole shoe 17 by a small air gap $a$, for example of 3 mm., i.e. the surface of the middle portion 31 is guided parallelly to the corresponding surface of the pole shoe 17. By the sudden interruption of the magnetic flux at the point of contact 30 another magnetic flux path is produced leading from the south pole of the permanent magnet 16 over the pole shoe 9, the air gap $a$ and the pole shoe 17 to the north pole of the permanent magnet 16. This other flux exerts in the air gap $a$ an attraction onto the pole shoe 17 according to the negative characteristic of a curve 42. Owing to the disappearance of the attraction between the two pole shoes 9 and 17 and the point of contact 30 the pole shoe 17 does no more act as a beam clamped at one end and supported at the other end but as a beam clamped at one end only so that its spring force follows the line 43. The movable handle 24 is thus opposed by a spring force according to line 43 and by a magnetic force according to curve 42. The sum of both these forces is represented by the curve 44.

Figure 4:
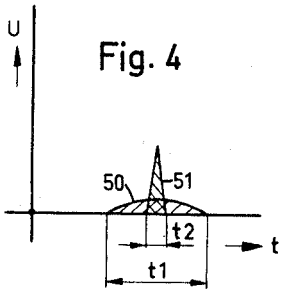
FIGURE 4 is a voltage-time diagram associated to the generator shown in FIGURES 1 and 2.

As already mentioned the force of actuation attains its highest value at point 41. By the appearance of the suddenly increasing air gap at the point of contact 30 the force of actuation decreases from point 41 to a point 45 on curve 44, so that the line 47 represents the stored force producing the suddenly increasing air gap. This increase of the air gap, which is only dependent on the stored force, produces in coil 12 to a very rapid and repeatable change of the magnetic flux. If for example this stored force would not be available the air gap at the point of contact 30 would increase in a substantially longer time interval dependent on the speed of actuation, i.e. a pulse would be produced with a switching time t1 according to the curve 50 of the diagram of FIGURE 4. In the last mentioned diagram the produced potential U is measured on the ordinate and the time $t$ is measured on the abscissa. The potential amplitude U of the curve 50 in this case however would be very small and would require amplification and consequently the provision of costly amplifiers. By the sudden increase of the air gap at the point of contact 30, the time t2 of the potential area becomes very small. In consequence thereof the potential amplitude of a produced pulse 51 is considerably increased so that the magniture of this pulse is sufficient for operating a control preferably provided with contactless logical elements.

The time t2 of the pulse 51 may further be shortened by appropriate shaping of the resilient pole shoe 17, whereby such shapings are well known for snap switches, so that it is possible to obtain a maximum value of the potential amplitude. Such particular shaping affords for satisfactory operation even if the required path of operation does not exceed a few tenth of millimeters.

As soon as the force of actuation acting on the movable handle 24 decreases the force according to curve 44 acts against this handle and returns the latter into its rest position. When point 46 is attained the magnetic attraction in the air gap at the point of contact 30 exceeds the force of inertia of the movable parts and the decreasing force of actuation so that the resilient pole shoe is partly flexed and the two pole shoes are again coupled at the point of contact 30. The course of the force from point 46 on now again follows approximatively the line 40 to the point O, at which point the handle 24 is again in its rest position.

The pulse produced in the winding 12 is fed over terminal 14 and a lead 55 to a utilization device 56 and returns over the ground to the terminal 13. By this arrangement only one sole lead 55 is required from the contactless generator to the utilization device 56 of a control. As soon as the utilization device 56 has received the pulse an indicating potential is applied to the lamp 6 over lead 57 and 58 for lighting it.

FIGURE 5 shows another embodiment of a generator according to the invention not provided with a signal lamp. A rigid not represented operating member acts onto a movable handle 59. The difference with respect to the contactless generator of FIGURE 1 consists in that the movable pole shoe 6 is not constituted by a resilient element but rather is pivotally mounted. This mounting takes place at point 61 and is such that attraction of the permanent magnet 16 affords for a constant contact of one leg 62 of the movable pole shoe 60. The potential force for producing an air gap increasing at high speed at the point of contact 63 is produced by a spring 65 in the movable handle 59. The push button 25 is provided with a boring 66 in which a movable button 67 is guided in a hollow space 68. The hollow space 68 houses the spring 65. As soon as a force of actuation acts onto the button 67 the spring 65 is compressed until the force stored in the spring has approximatively attained the magnetic attraction force produced by the flux. At this moment the force stored in the spring 65 produces an air gap increasing at high speed, i.e. the pole shoe 60 pivotes about the pivoting point 61 and the leg 62 is pivoted away from the permanent magnet 16. The mentioned increase of the air gap produces as has already been described again a pulse in the winding 12. The magnetic force now appearing in the air gap $a$ pulls back, after the release of the force of actuation on button 67, the pole shoe 60 into its position in contact with pole shoe 9 and simultaneously returns the handle 59 into its rest position. This withdrawal force acting onto pole shoe 60 is further supported by the attraction force in the small air gap appearing between the leg 62 and the magnet 16 at the rotation so that a safe return of this pole shoe into its rest position is assured.

In the generator according to FIGURE 6 the upper part 2 is provided with a boring 70 in which a movable handle 71 is guided through a tap 73. Rotation of this movable handle is prevented by a pin 72 secured in the upper part 2. The tap 73 acts onto a spring 74 supported on the movable pole shoe 60. The stationary pole shoe 9 is provided with a boring 75 for the passage of spring 74.

The generator illustrated in FIGURE 7, is constructed as terminal switch and corresponds to that of FIGURE 5 except for the shaping of the movable handle which according to FIGURE 7 is shown as rigid, movable handle 80 provided with a push button 81. A release 83 is slidably secured to a movable part 82, which may be the carriage of a machine tool. This release 83 has a boring 84 guiding a piston 85. The latter is held in the boring 84 by a threaded sleeve 86. Upon actuation of the generator the piston 85 acts onto the push button 81. In the hollow space 87 of the release 83 increased by the boring 88 in the piston 85 there is contained a compressable fluid, for example air, which is compressed by the counterforce of the movable handle 80 until the force stored by such compression exceeds the attraction force at the point of contact 63 of the two pole shoes. By the thus produced air gap a signal is generated as mentioned in the description of FIGURE 5.

The movable handle of the generator may be actuated by any appropriate type of mechanical releasing means such as levers, abutments secured to movable parts and the like. The handle 59 according to FIGURE 5 may also be replaced by a rigid button as shown in FIGURE 1 provided that its actuation is effected by a finger since the force required for the production of the air gap is then stored in the finger.

I claim:

1. A contactless inductive generator comprising a stationary pole shoe of magnetically conductive material, said first stationary pole shoe having first and second legs, an inductance coil developed about said first leg, a permanent magnet having oppositely polarized first and second poles, means for maintaining the second leg of said stationary pole shoe fixedly in contact with the first pole of said permanent magnet, a movable pole shoe of magnetically conductive material, said movable pole shoe having a leg and a resilient tongue, means for maintaining the leg of said movable pole shoe fixedly in contact with the second pole of said permanent magnet, said resilient tongue having one end integral with the leg of said movable pole shoe and a free end disposed opposite the end of said first leg of said stationary pole shoe and normally attracted to contact said end of said first leg by the magnetic flux established by said permanent magnet in the circuit including said permanent magnet, said stationary pole shoe and said movable pole shoe, and an actuatable handle having one end in contact with the resilient tongue of said movable pole shoe and capable in response to actuation of movement in a direction to urge the free end of said resilient tongue out of contact with said first leg, said resilient tongue initially storing a force when said handle is actuated equal to the force required to overcome the magnetic force of attraction between the free end of said resilient tongue and said end of said first leg and exerting said stored force at the instant of separation of said pole shoes for increasing the air gap between the free end of said resilient tongue and said end of said first leg so that an electrical pulse of repeatable shape is obtained independent of the speed of actuation of said handle.

2. The contactless inductive generator of claim 1 wherein the free end of said resilient tongue of said movable pole shoe bears against the end of said first leg of said stationary pole shoe under pre-tension when said handle is not actuated.

3. The contactless inductive generator of claim 1 wherein said stationary and said movable pole shoes include recesses, and including an indicator lamp pocket disposed in said recesses.

References Cited in the file of this patent

UNITED STATES PATENTS

| | | |
|---|---|---|
| 2,426,322 | Pridham | Aug. 26, 1947 |
| 2,491,902 | Ostline | Dec. 20, 1949 |
| 2,784,327 | Drescher | Mar. 5, 1957 |
| 2,930,910 | Fleming | Mar. 29, 1960 |